(12) United States Patent
Hahto et al.

(10) Patent No.: US 11,359,980 B2
(45) Date of Patent: Jun. 14, 2022

(54) DEVICE AND METHOD FOR MEASURING A LOAD APPLIED BY AN ELONGATE MEMBER

(71) Applicant: British Columbia Hydro and Power Authority, Vancouver (CA)

(72) Inventors: Paul Andrew Hahto, Nanaimo (CA); Alexander Donald Kearney, Victoria (CA)

(73) Assignee: BRITISH COLUMBIA HYDRO AND POWER AUTHORITY, Vancouver (CA)

( * ) Notice: Subject to any disclaimer, the term of this patent is extended or adjusted under 35 U.S.C. 154(b) by 386 days.

(21) Appl. No.: 16/551,700

(22) Filed: Aug. 26, 2019

(65) Prior Publication Data

US 2021/0063260 A1    Mar. 4, 2021

(51) Int. Cl.
  *G01L 1/00* (2006.01)
  *G01L 1/22* (2006.01)
  *G01L 5/00* (2006.01)

(52) U.S. Cl.
  CPC .......... *G01L 1/2287* (2013.01); *G01L 1/2212* (2013.01); *G01L 5/0061* (2013.01)

(58) Field of Classification Search
  CPC .... G01L 1/2287; G01L 1/2212; G01L 5/0061
  See application file for complete search history.

(56) References Cited

U.S. PATENT DOCUMENTS

| | | | | |
|---|---|---|---|---|
| 5,814,773 A | * | 9/1998 | Latiri | A63B 60/46 177/171 |
| 7,424,832 B1 | * | 9/2008 | Nunnelee | G01L 5/107 73/862.472 |
| 11,168,700 B2 | * | 11/2021 | Darry | F04D 29/284 |
| 2010/0116012 A1 | * | 5/2010 | Hermes | B21D 7/08 72/166 |
| 2011/0232469 A1 | * | 9/2011 | Deleignies | B26D 1/0006 89/1.14 |
| 2015/0068318 A1 | * | 3/2015 | Bardin | G08C 17/02 73/828 |
| 2018/0214729 A1 | * | 8/2018 | Rubin | A63B 21/0058 |
| 2020/0011289 A1 | * | 1/2020 | Steenstrup | F03B 13/20 |
| 2020/0048034 A1 | * | 2/2020 | Eberling | G01G 19/18 |
| 2021/0120879 A1 | * | 4/2021 | Zhu | A61L 2/10 |

OTHER PUBLICATIONS

Website: "https://www.lcmsystems.com/getting-best-your-load-pin"; download date: Dec. 5, 2019; 8 pps.

\* cited by examiner

*Primary Examiner* — Max H Noori
(74) *Attorney, Agent, or Firm* — RowanTree Law Group, PLLC; Magdalena M. Fincham (57) ABSTRACT

There is described a device, such as a wireholder, for measuring a load of an elongate member, such as a power line. The device includes a body, a load-bearing member, and a first sensor operable to measure a load applied to the load-bearing member in a first direction, for example a direction of sensitivity defined by the first sensor. The load-bearing member is movably coupled to the body such that the load-bearing member is displaced from a reference position as a function of a load applied to the load-bearing member in a second direction, such as a direction normal to the first direction. The device may further include a second sensor for measuring a displacement of the load-bearing member.

19 Claims, 9 Drawing Sheets

| Resultant load | 1,000 lbs |
| Vertical load | 1,000 lbs |
| Horizontal load | 0 lbs |
| Rocker assembly angle | 0° |
| Wireholder angle | 0° |

FIG. 5B

| Resultant load | 1,000 lbs |
| Vertical load | 924 lbs |
| Horizontal load | 383 lbs |
| Rocker assembly angle | 22.5° |
| Wireholder angle | 0° |

DEVICE AND METHOD FOR MEASURING A LOAD APPLIED BY AN ELONGATE MEMBER

FIELD OF THE DISCLOSURE

The present disclosure relates to devices and methods for measuring a load applied by an elongate member. According to some embodiments, the disclosure relates to a wireholder for measuring a load applied by a conductor, such as a power line.

BACKGROUND TO THE DISCLOSURE

Wireholders are devices used to temporarily hold in place live conductors, especially power lines, to facilitate maintenance and repair, for example. A wireholder is typically attached to an electrically insulated jib (an arm used to support the wireholder), and moved into position using the boom of a bucket truck, line truck, crane truck, or similar vehicle. Because such conductors are often under considerable mechanical tension, a substantial load is exerted on the wireholder when a power line is being held by the wireholder.

These high loads can pose a danger to the operator of the vehicle, the vehicle holding the wireholder in place, and anyone or anything underneath the power line being worked on. For example, as a consequence of the high loads exerted by power lines on wireholders, accidents have occurred in which jibs or wireholders have failed and as a result live conductors have dropped onto the supporting vehicle or ground below. Even if the jib and wireholder are strong enough to avoid failing, the high loads could, depending on their direction of application, cause trucks to roll onto their sides. It is therefore important for operators of vehicles with jibs and wireholders to be aware of the magnitude and direction of loads applied to a wireholder in use.

With this background in mind, the present disclosure seeks to provide new and improved devices and methods for measuring a load applied by an elongate member.

SUMMARY OF THE DISCLOSURE

According to a first aspect of the disclosure, there is provided a device for measuring a load applied by an elongate member, comprising: a body; a load-bearing member; and a first sensor operable to measure a load applied to the load-bearing member in a first direction, wherein the load-bearing member is movably coupled to the body such that the load-bearing member is displaced from a reference position as a function of a load applied to the load-bearing member in a second direction.

When no load is applied to the load-bearing member in the second direction, the load-bearing member may be in the reference position.

The device may further comprise a second sensor operable to measure a displacement of the load-bearing member from the reference position.

The reference position may be aligned with a vertical axis.

The first direction may be a direction of sensitivity defined by the first sensor.

The load-bearing member may comprise the first sensor.

The second direction may be normal to the first direction.

The first sensor may comprise one or more strains gauges.

The first sensor may comprise a strain gauge positioned at ends of a pin.

When the load-bearing member is in the reference position, a vertical axis may be aligned with a direction of sensitivity defined by the first sensor.

The load-bearing member may be rotatably coupled to the body such that the load-bearing member is rotated relative to the body as a function of a load applied to the load-bearing member in the second direction.

The second sensor may be operable to measure an angular orientation of the load-bearing member relative to a vertical axis.

The second sensor may comprise an inclinometer or an accelerometer.

The device may further comprise a transmitter communicatively coupled to the first sensor and configured to transmit a reading of a load measured by the first sensor.

The transmitter may be further communicatively coupled to a second sensor and further configured to transmit a reading of a displacement of the load-bearing member from the reference position measured by the second sensor.

The transmitter may be a wireless transmitter.

The load-bearing member may comprise a surface shaped to align a direction of a load applied to the load-bearing member with a direction of sensitivity defined by the first sensor.

The device may be a wireholder and the elongate member may be a power line.

According to a further aspect of the disclosure, there is provided a system comprising: a device for measuring a load applied by an elongate member, comprising: a body; a load-bearing member; and a first sensor operable to measure a load applied to the load-bearing member in a first direction, wherein the load-bearing member is movably coupled to the body such that the load-bearing member is displaced from a reference position as a function of a load applied to the load-bearing member in a second direction; a second sensor operable to measure a displacement of the load-bearing member from the reference position; and processing equipment configured, based on a reading of a load measured by the first sensor and a reading of a displacement of the load-bearing member measured by the second sensor, to determine a load applied to the load-bearing member in the second direction.

The processing equipment may comprise one or more processors communicative with memory having stored thereon computer program code configured when executed by the one or more processors to cause the one or more processors to determine the load applied to the load-bearing member in the second direction.

The first direction may be a direction of sensitivity defined by the first sensor.

When no load is applied to the load-bearing member in the second direction, the load-bearing member may be in the reference position.

The reference position may be aligned with a vertical axis.

The load-bearing member may comprise the first sensor.

The second direction may be normal to the first direction.

The first sensor may comprise one or more strains gauges.

The first sensor may comprise a strain gauge positioned at ends of a pin.

When the load-bearing member is in the reference position, a vertical axis may be aligned with a direction of sensitivity defined by the first sensor.

The load-bearing member may be rotatably coupled to the body such that the load-bearing member is rotated relative to the body as a function of a load applied to the load-bearing member in the second direction.

The second sensor may be operable to measure an angular orientation of the load-bearing member relative to a vertical axis.

The second sensor may comprise an inclinometer.

The second sensor may comprise an accelerometer.

The system may further comprise a transmitter communicatively coupled to the first sensor and configured to transmit to the processing equipment a reading of a load measured by the first sensor.

The transmitter may be further communicatively coupled to the second sensor and further configured to transmit to the processing equipment a reading of a displacement of the load-bearing member from the reference position measured by the second sensor.

The transmitter may be a wireless transmitter.

The load-bearing member may comprise a surface shaped to align a direction of a load applied to the load-bearing member with a direction of sensitivity defined by the first sensor.

The device may be a wireholder and the elongate member may be a power line.

According to a further aspect of the disclosure, there is provided a method of determining a load applied to a wireholder, comprising: providing a wireholder comprising: a body; and a load-bearing member movably coupled to the body such that the load-bearing member is displaced from a reference position as a function of a load applied to the load-bearing member in a first direction; positioning an elongate member on the load-bearing member so as to apply a load on the load-bearing member; and measuring the load applied to the load-bearing member in the first direction.

Measuring the load may comprise: measuring, relative to the reference position, a displacement of the load-bearing member in response to the load; and measuring, based on the displacement, the load applied to the load-bearing member in the first direction.

The method may further comprise: measuring a load applied to the load-bearing member in a second direction, wherein measuring the load applied to the load-bearing member in the first direction is further based on the load applied to the load-bearing member in the second direction.

The second direction may be normal to the first direction.

The second direction may be a direction of sensitivity defined by a sensor operable to measure the load applied to the load-bearing member in the second direction.

The reference position may be aligned with a vertical axis.

Measuring the load applied to the load-bearing member in the second direction may be performed with a sensor, and the load-bearing member may comprise the sensor.

The sensor may comprise one or more strains gauges.

The sensor may comprise a strain gauge positioned at ends of a pin.

The load-bearing member may be rotatably coupled to the body such that the load-bearing member is rotated relative to the body as a function of a load applied to the load-bearing member in the first direction.

The load-bearing member may comprise a surface shaped to align a direction of the load applied to the load-bearing member with a direction of sensitivity defined by the sensor.

The elongate member may be a power line.

According to a further aspect of the disclosure, there is provided a wireholder for measuring a load of an elongate member, comprising: one or more load-bearing members; and a first sensor operable to measure a load applied to the load-bearing member in a first direction; and a second sensor operable to measure a load applied to the load-bearing member in a second direction normal to the first direction.

The first sensor may comprise one or more strain gauges.

The first sensor may comprise a strain gauge at each end of a pin.

The second sensor may comprise one or more strain gauges.

The second sensor may comprise a strain gauge at each end of a pin.

The one or more load-bearing members may comprise one or more surfaces shaped to align a direction of a load applied to the load-bearing member with a direction of sensitivity defined by the first sensor and a direction of sensitivity defined by the second sensor.

The elongate member may be a power line.

According to a further aspect of the disclosure, there is provided a wireholder for measuring a load of an elongate member, comprising: a load-bearing member; and a sensor operable to measure a load applied to the load-bearing member in a horizontal direction.

BRIEF DESCRIPTION OF THE DRAWINGS

Embodiments of the disclosure will now be described in detail in conjunction with the accompanying drawings of which.

DETAILED DESCRIPTION OF EMBODIMENTS

The present disclosure seeks to provide improved devices and methods for measuring a load applied by an elongate member, such as a power line. While various embodiments of the disclosure are described below, the disclosure is not limited to these embodiments, and variations of these embodiments may well fall within the scope of the disclosure which is to be limited only by the appended claims.

As described above, it is important for operators of wireholders to be aware of the magnitude of loads applied to a wireholder in use. In particular, wireholders may typically only be able withstand a maximum vertical load. Furthermore, although power lines may typically run north-south and east-west, power lines may additionally be required to run at an angle to these primary directions, thereby importing horizontal loads on wireholders. Power lines that do run north-south and east-west are also sometimes lifted and moved sideways out of the way of crew working on the pole, and are thereby exposed to horizontal loads. Without knowing the magnitude of a horizontal load that is applied to a wireholder, recommended loads could accidentally be exceeded.

Generally, according to embodiments of the disclosure, there is described a wireholder for measuring a load applied by an elongate member, such as an elongate conductor, and in particular such as a power line. The wireholder includes a body and a load-bearing member rotatably coupled to the body. The load-bearing member comprises a first sensor (which may include for example one or more strain gauges). When the power line is positioned on top of the load-bearing member, the first sensor measures a load applied to the load-bearing member in a first direction. The first direction may be, for example, a direction of sensitivity defined by the first sensor. In addition, when the power line is positioned on top of the load-bearing member, the load-bearing member rotates to a particular angular orientation relative to the body as a function of a load applied to the load-bearing member in a second direction. The second direction may be, for example, a direction normal to the first direction, or in other words a direction normal to the direction of sensitivity defined by the first sensor. A second sensor, such as an inclinometer, measures the angular orientation (relative to the vertical axis) of the load-bearing member in response to the load. Based on the readings of the first and second sensors, a vector of the resultant load may be determined, including its components in both the first and second directions. In particular, since the second sensor may measure the angular orientation of the load-bearing member relative to the vertical, both vertical and horizontal components of the load may be determined.

Figure 1:
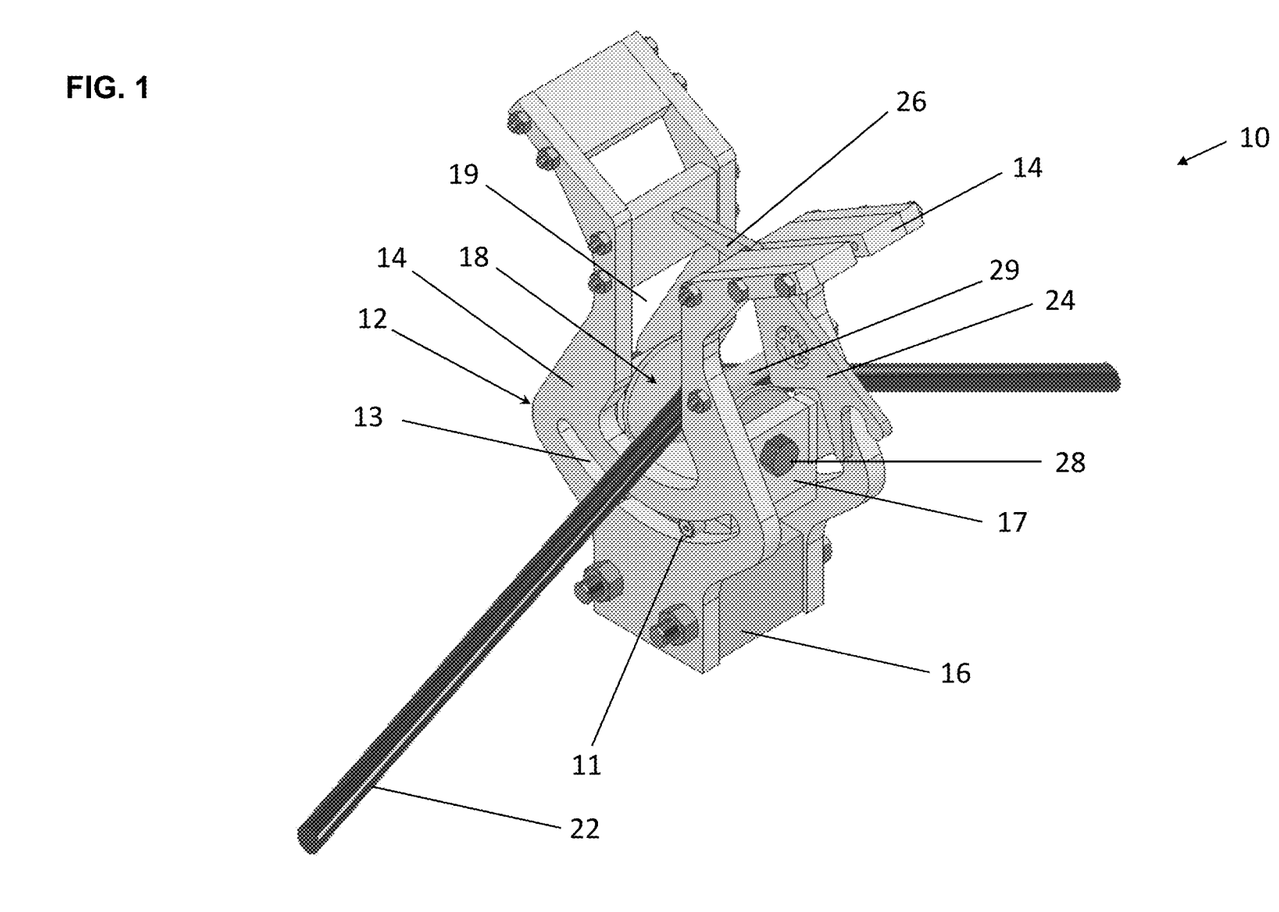
FIG. 1 is a perspective view of a wireholder holding a power line, according to embodiments of the disclosure.
Figure 2:
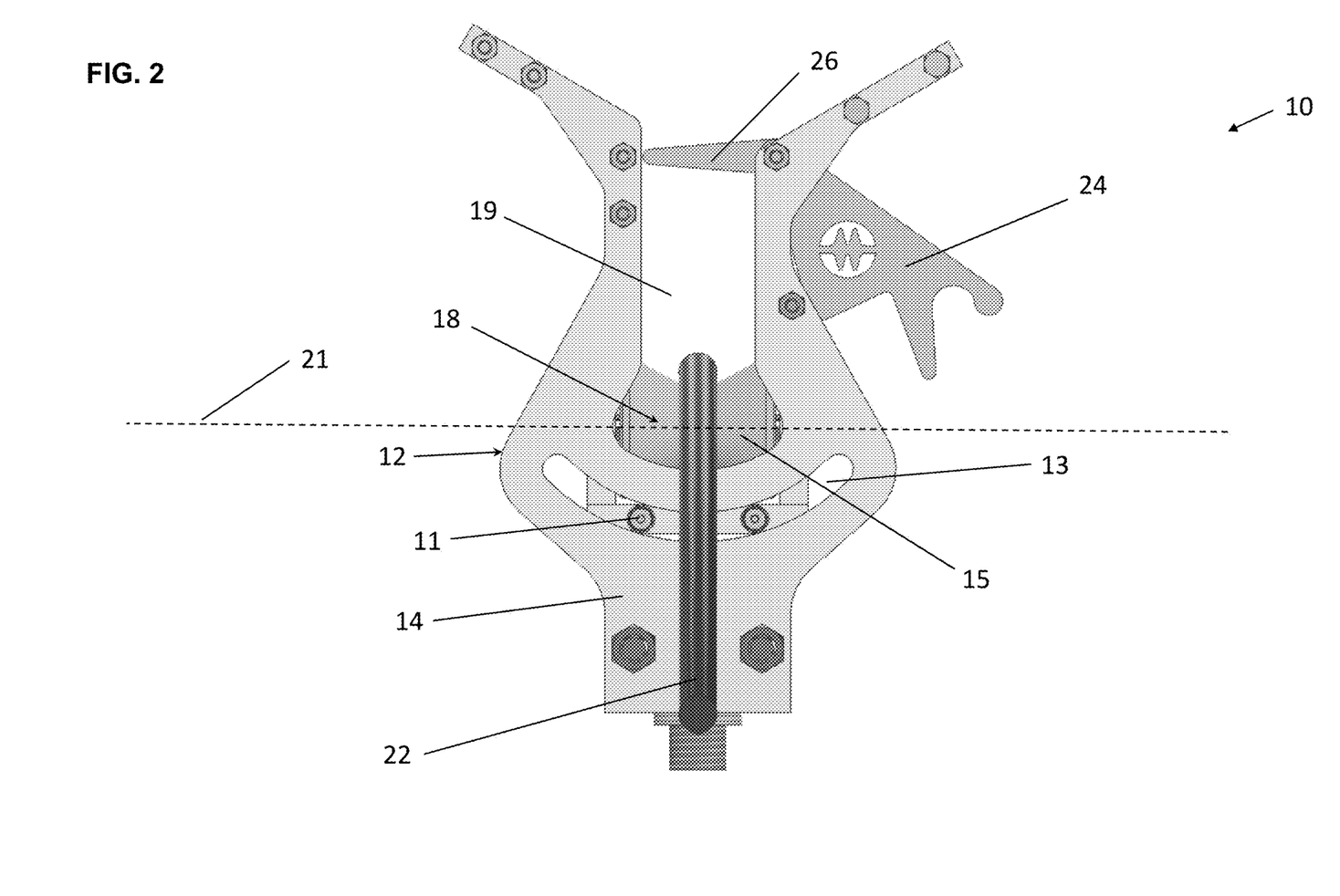
FIG. 2 is a front view of the wireholder of FIG. 1.
Figure 3:
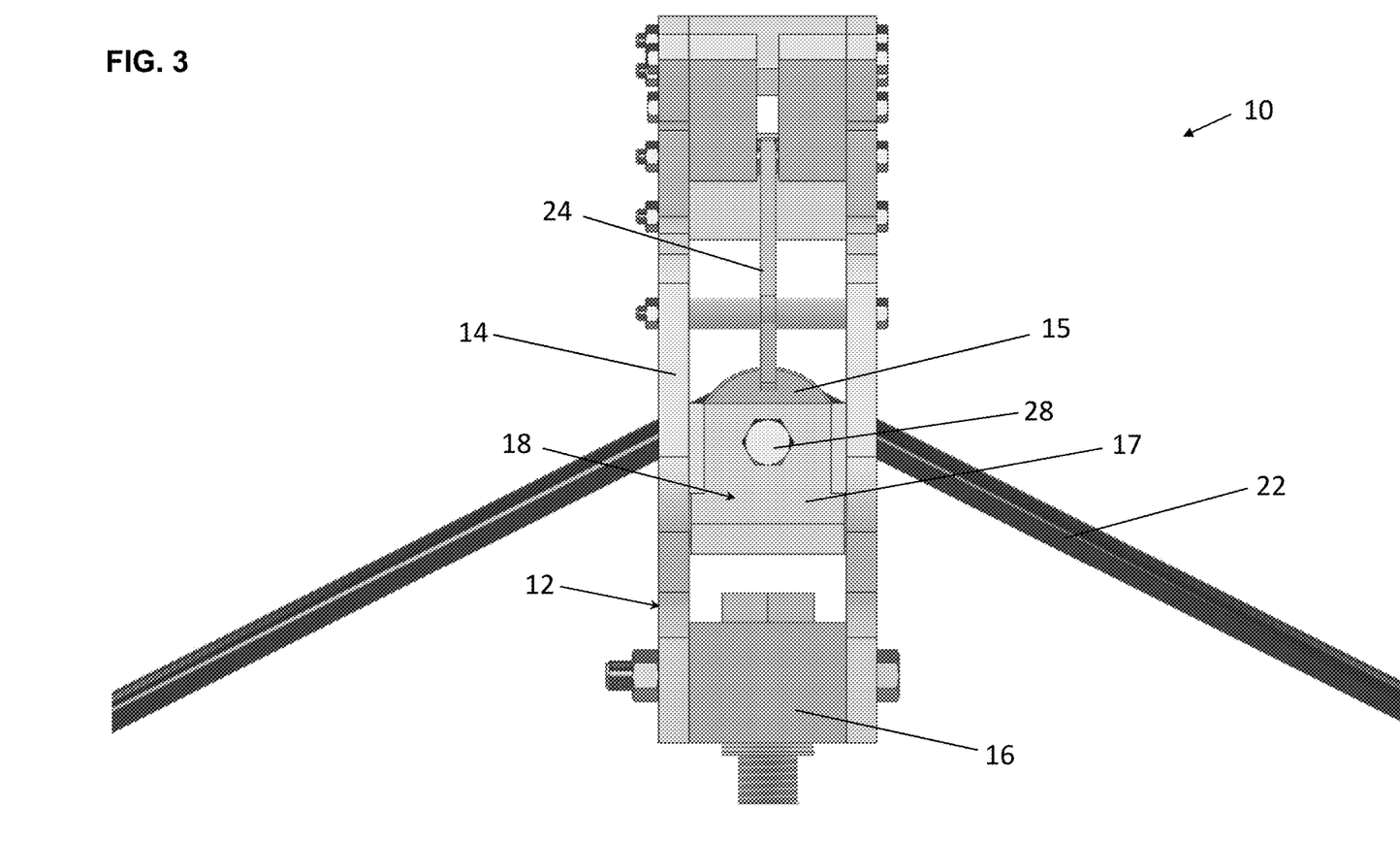
FIG. 3 is a side view of the wireholder of FIG. 1.

Turning to FIGS. 1-3, there are shown different views of a wireholder 10 according to embodiments of the disclosure. Wireholder 10 comprises a body 12 including a pair of opposing supports 14. Supports 14 are spaced apart using a block 16 that is fixed to supports 14. Wireholder 10 further comprises a rocker assembly 18 disposed between supports 14 and operable to rotate or pivot relative to body 12. In particular, rocker assembly 18 comprises bearings 11 positioned within curved tracks 13 formed within supports 14. Rocker assembly 18 is therefore supported by and may move within tracks 13. Rocker assembly 18 comprises a V-shaped pulley 15 (shown in more detail in FIG. 2) positioned between and attached to rocker supports 17 at either end of rocker assembly 18.

Body 12 defines a groove or space 19 within which an elongate member, such as a conductor, and in particular such as a power line, may be positioned. FIG. 1 shows a power line 22 positioned within groove 19 and engaged against pulley 15. In practice, wireholder 10 may be the only support holding up power line 22 over a substantial length of power line 22. Therefore, power line 22 typically exerts a substantial load on rocker assembly 18 and in particular on pulley 15. Therefore, rocker assembly 18 may be referred to as a load-bearing member.

Wireholder 10 further includes a latch 24 for preventing power line 22 from accidentally disengaging from wireholder 10 (should, for example, wireholder 10 be lowered or rotated away from a vertical orientation). Latch 24 is fixed between supports 14 and is rotatable relative to body 12. Latch 24 includes a locking member 26 extending across groove 19 and preventing power line 22 from accidentally disengaging from wireholder 10. Latch 24 is operable to rotate in a direction such that locking member 26 may be moved in a downward direction (for example in response to power line 22 being inserted into groove 19) to enable power line 22 to be received within groove 19. However, latch 24 is prevented from rotating in the opposite direction by a stop 29 extending between supports 14. Wireholder 10 further includes a pair of strain gauges (not shown) installed on a pin 28, such as a load cell pin 28, provided in rocker assembly 18 and extending laterally across rocker supports 17. The strain gauges, located at rocker supports 17, are used on load cell pin 28 to measure the strain at rocker supports 17. The strain gauges are thus configured to measure a load applied to rocker assembly 18 perpendicular to a longitudinal axis 21 of load cell pin 28. Longitudinal axis 21 of load cell pin 28 is shown in FIG. 2. Therefore, the strain gauges define an axis of sensitivity perpendicular to longitudinal axis 21. The axis of sensitivity may therefore be an axis of greatest sensitivity of the strain gauges (i.e. a direction in which the strain gauges are most sensitive).

Pulley 15 of rocker assembly 18 comprises a V-shaped surface for urging power line 22 into a position that is at the midway plane of load cell pin 28 (i.e. halfway between rocker supports 17) such that a load of power line 22 is applied on load cell pin 28 equidistant from both strain gauges. For example, if power line 22 is initially positioned slightly off the midway plane of load cell pin 28, then, due to the V-shaped surface of pulley 15, power line 22 will come to rest naturally at the lowest point of pulley 15, and the application point of its load will be centered on load cell pin 28, and will therefore align with the axis of sensitivity defined by the strain gauges. According to some embodiments, instead of a V-shaped surface, pulley 15 may comprise any other suitable surface, such as a curved or concave surface, for aligning a load applied by power line 22 with the axis of sensitivity defined by the strain gauges. Pulley 15 also has the function of providing a surface for any horizontal load of power line 22 to act upon, to therefore enable rotation of rocker assembly 18 in the direction of the horizontal load.

In FIGS. 1-3, rocker assembly 18 is shown in its reference position. The reference position of rocker assembly 18 may be a position in which rocker assembly 18 rests when no load is applied to rocker assembly 18, or else when only a vertical load is applied to rocker assembly 18 (in other words, when only a load directed perpendicularly to longitudinal axis 21 is applied to rocker assembly 18).

Figure 4:
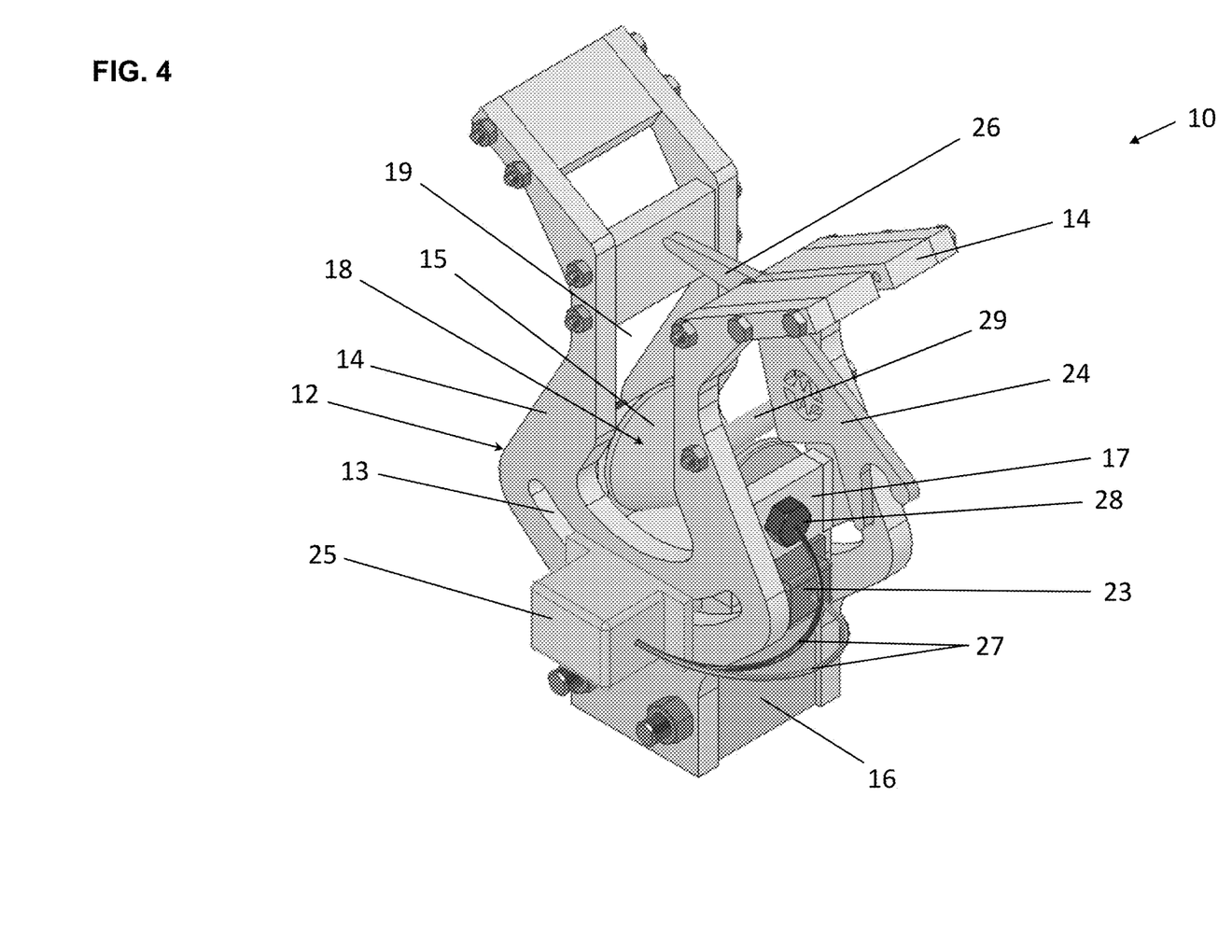
FIG. 4 is a perspective view of the wireholder of FIG. 1, additionally showing an angular displacement sensor and a transmitter, according to embodiments of the disclosure.

Turning now to FIG. 4, wireholder 10 further includes an angular displacement sensor, such as an inclinometer 23, positioned on wireholder 10. For example, inclinometer 23 may be positioned on one of supports 17 of rocker assembly 18. According to some embodiments, instead of being positioned on one of supports 17, the angular displacement sensor may be integrated in load cell pin 28. Inclinometer 23 is operable to measure an angular orientation of rocker assembly 18 relative to the vertical (i.e. the angular displacement, from its reference position, of rocker assembly 18 along tracks 13). Various other sensors may be used for detecting the angular orientation of rocker assembly 18 relative to its reference position. For example, an accelerometer, or any other suitable sensor may be used. More generally, rotary position sensors may be used, such as gear tooth sensors and rotary potentiometers. Such sensors may be configured to determine the angular position of rocker assembly 18 relative to body 12, in which case, in order to determine the angular orientation of rocker assembly 18 relative to the vertical, the operator would need to know the angular orientation of body 12.

Wireholder 10 further includes a wireless transmitter 25 positioned on one of supports 14. Transmitter 25 is communicatively coupled, for example by suitable wiring 27, to inclinometer 23 and load cell pin 28.

In operation, wireholder 10 is configured to enable an operator to determine components of a load exerted by power line 22 on wireholder 10 in directions along a vertical axis as well as normal to the vertical axis (i.e. along a horizontal axis). In particular, wireholder 10 is configured to enable an operator to determine a vertical component of the load exerted on rocker assembly 18 by power line 22, in addition to a horizontal component of the load exerted on rocker assembly 18 by power line 22.

In the event that power line 22 exerts a load in a direction at an angle to the vertical axis, then a component of power line 22's overall load will result in rocker assembly 18 rotating relative to body 12 along tracks 13, away from its reference position. The new angular orientation of rocker assembly 18 relative to the vertical is detected by inclinometer 23. In addition, the strain gauges of load cell pin 28 measure the load of power line 22 in a direction perpendicular to longitudinal axis 21, i.e. along the axis of sensitivity defined by the strain gauges. Using trigonometry, it is then possible to determine a magnitude of the load that is exerted in a vertical direction as well as a magnitude of the load that is exerted in a horizontal direction.

In particular, transmitter 25 wirelessly transmits to a remote processor (for example a microprocessor) the measured orientation of rocker assembly 18 relative to the vertical, as well as the load of power line 22 perpendicular to longitudinal axis 21. The processor may process the data and output, for example, a component of the load that is exerted along the vertical axis as well as in a direction normal to the vertical axis (i.e. in a horizontal direction). The operator is therefore able to dynamically determine both vertical and horizontal components of the load. Such information may be particularly useful for determining whether any vertical or horizontal loads on wireholder 10 are acceptable or whether wireholder 10 is experiencing dangerous vertical or horizontal loads. According to some embodiments, the processing of the readings obtained by the strain gauges of load cell pin 28 and inclinometer 23 may be performed by a processor located on wireholder 10 itself.

Figure 5A:
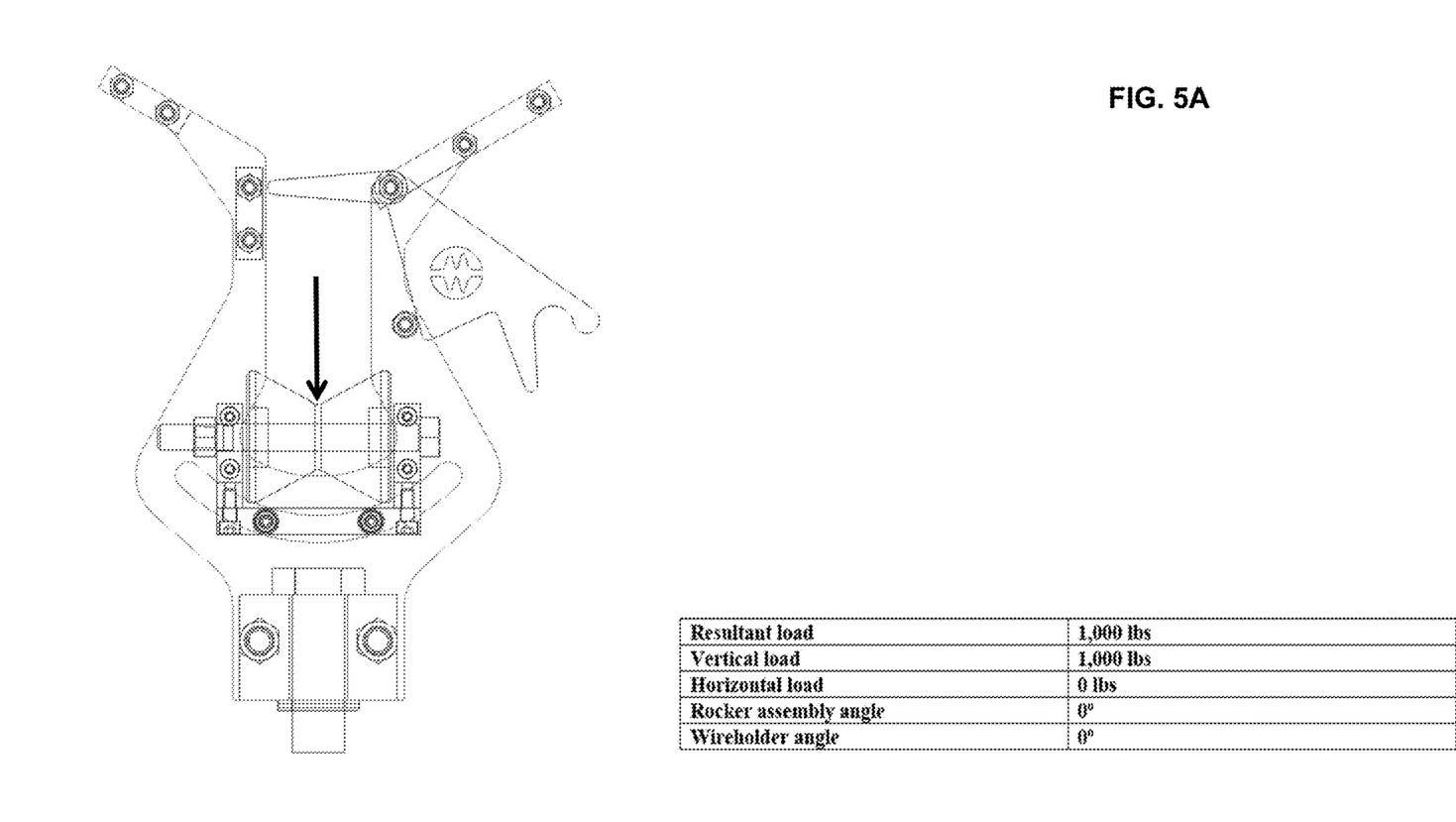
FIGS. 5A-5C are schematic diagrams of the wireholder of FIG. 1 with its rocker assembly shown at different angular orientations, according to embodiments of the disclosure.
Figure 5B:
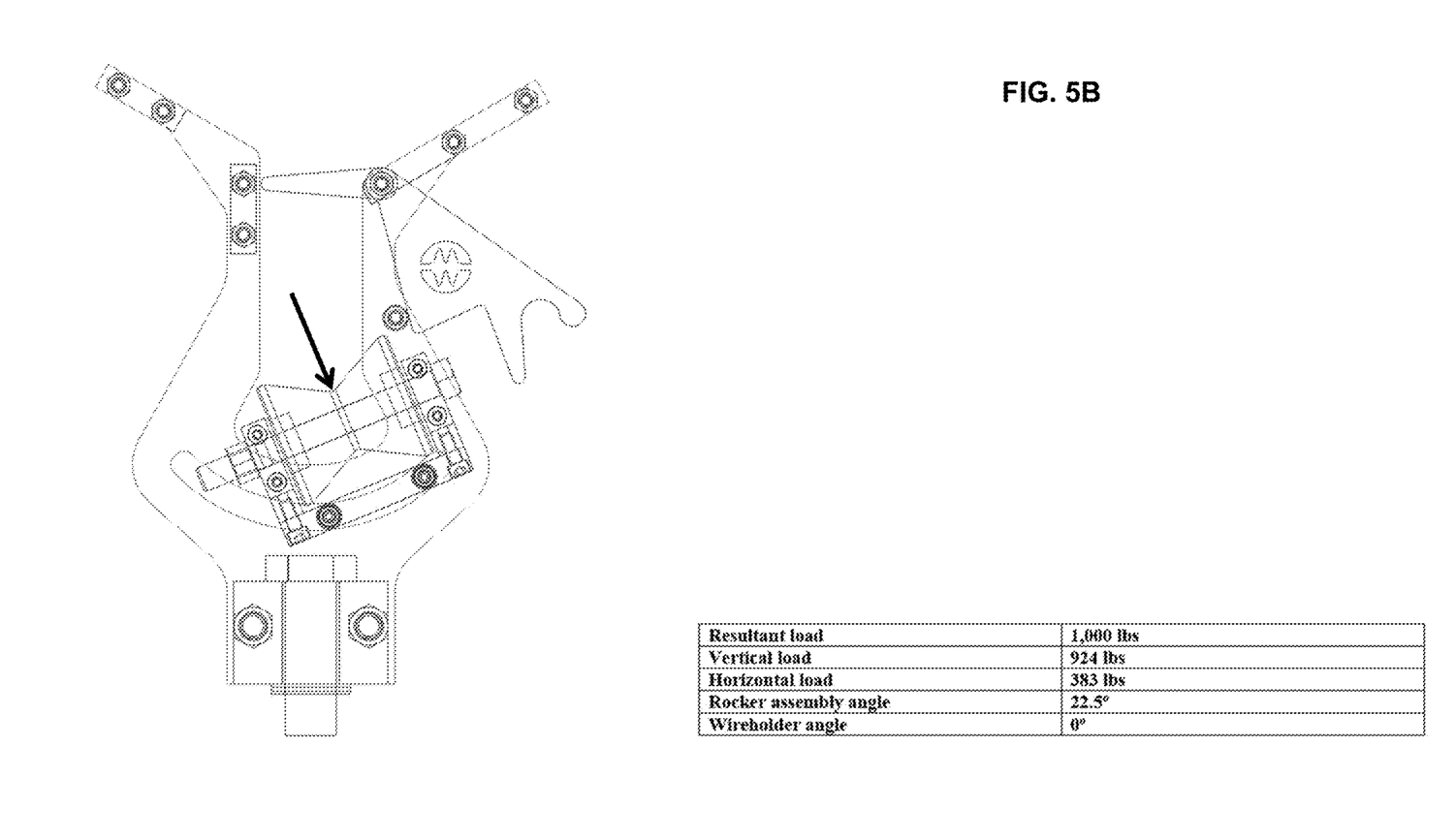
Figure 5C:
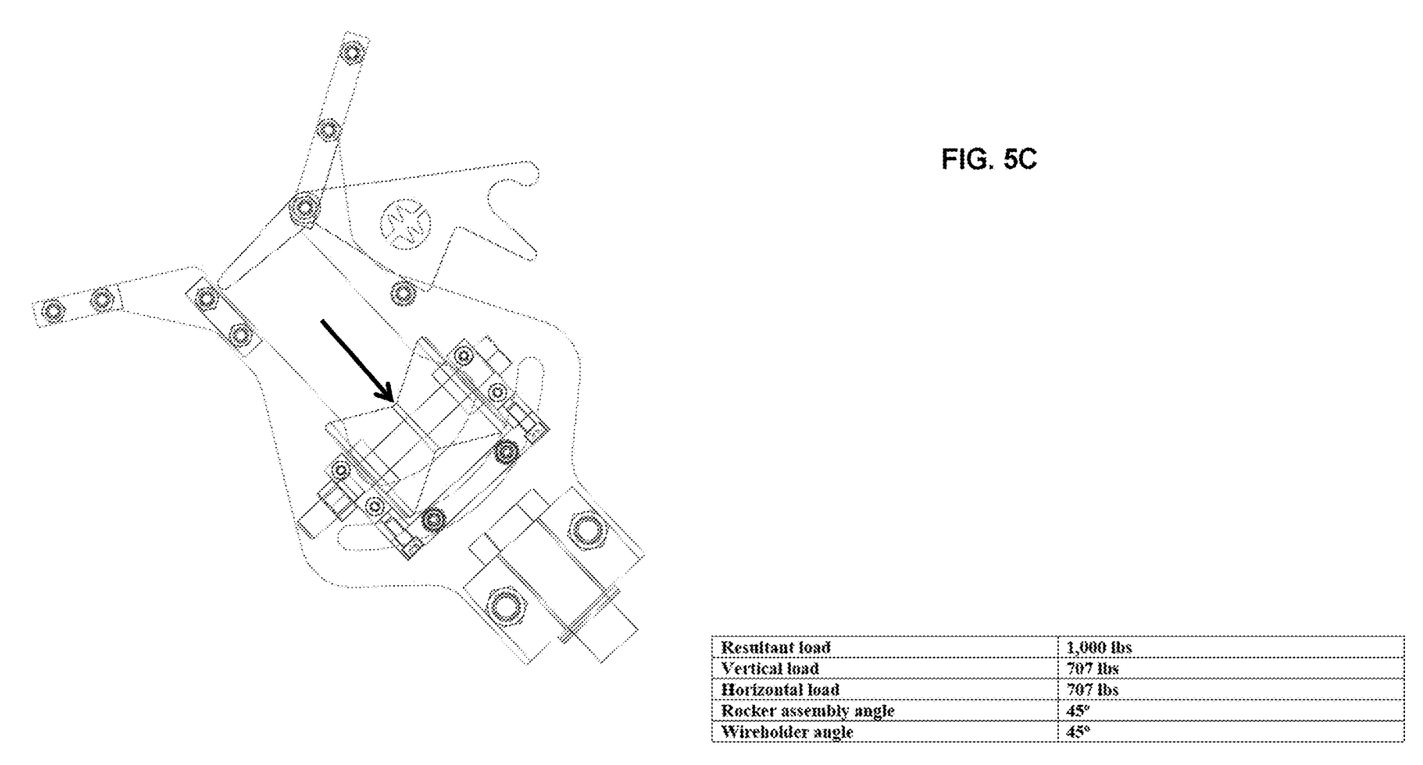

FIGS. 5A-5C show examples of loads that may be measured using wireholder 10.

Turning to FIG. 5A, there is illustrated an example case in which all of power line 22's load (1,000 pounds) is directed along the vertical axis. Therefore, the strain gauges of load cell pin 28 will detect a load of 1,000 pounds, and inclinometer 23 will measure an angular orientation of rocker assembly 18 of 0 degrees relative to the vertical (i.e. rocker assembly 18 is in its reference position). Accordingly, the remote processor (not shown) will determine that there is no component of the load that is normal to the vertical axis (i.e. there is no horizontal component to the load).

Turning to FIG. 5B, there is shown an example case in which power line 22's load is applied at an angle to the vertical axis. In this example, the strain gauges of load cell pin 28 detect a load of about 1,000 pounds along the axis of sensitivity defined by the strain gauges. Inclinometer 23 measures an angular orientation of rocker assembly 18 of 22.5 degrees relative to the vertical. Accordingly, the processor (not shown) determines that the component of the load that is vertical is about 924 lbs, and the component of the load that is normal to the vertical (i.e. the horizontal component) is about 383 pounds.

Turning to FIG. 5C, there is shown an example case in which power line 22's load is applied at an angle to the vertical axis. In addition, wireholder 10 is oriented at 45 degrees to the vertical. In this example, the strain gauges of load cell pin 28 detect a load of about 1,000 pounds along the axis of sensitivity defined by the strain gauges. Inclinometer 23 measures an angular orientation of rocker assembly 18 of 45 degrees relative to the vertical. Accordingly, the processor (not shown) determines that the component of the load that is vertical is about 707 lbs, and the component of the load that is normal to the vertical (i.e. the horizontal component) is about 707 pounds.

Depending on the angular extent of tracks 13 (or, more generally, the available extent of rotation of rocker assembly 18), it may be necessary for the operator to re-orient wireholder 10 for loads having particularly significant horizontal components. For example, if, in response to a power line load, rocker assembly 18 rotates to either end of tracks 13, then the operator may re-orient wireholder 10 such that rocker assembly 18 no longer rotates to either end of tracks 13, and may then perform the measurements of the vertical and horizontal components of the load.

Figure 6:
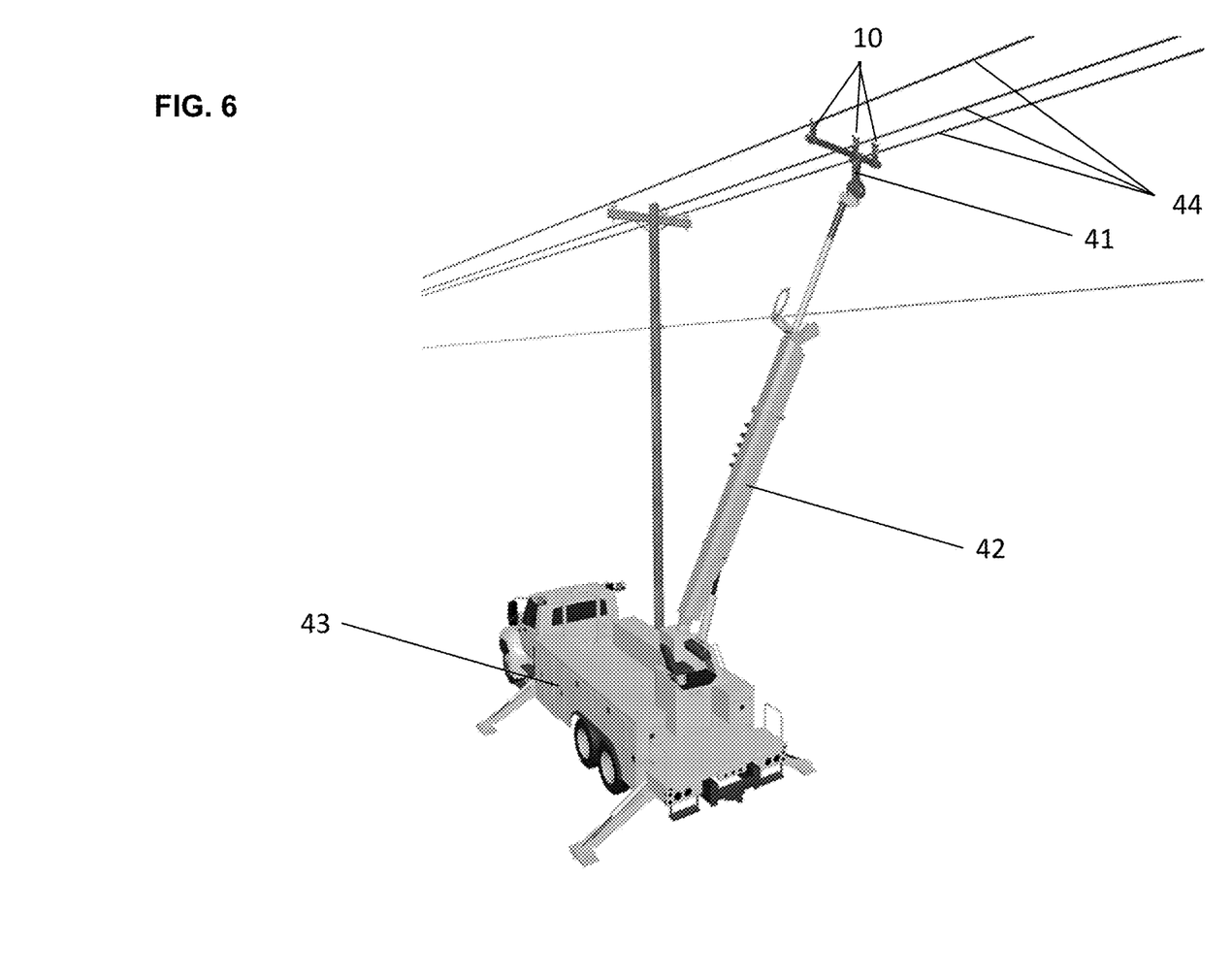
FIG. 6 shows wireholders, according to embodiments of the disclosure, being positioned by a vehicle.

FIG. 6 shows an example of wireholders 10 in use. In particular, an insulated jib 41, to which are attached three wireholders 10, is moved into a suitable position using a boom 42 of a vehicle 43. Wireholders 10 are used to hold power lines 44 in position.

According to some embodiments, instead of electronically communicating the reading of the load perpendicular to longitudinal axis 21 and the reading of the angular orientation of rocker assembly 18 relative to the vertical, it is possible for an operator to manually estimate a horizontal load on wireholder 10. For example, an operator may know that a typical power line exerts a vertical load of about 1,000 pounds when there is no horizontal component to the load. Therefore, assuming for example that, in response to a load exerted by a power line, rocker assembly 18 is displaced to an angle of 45 degrees relative to the vertical, then the operator may determine that the resulting horizontal load is approximately 707 pounds.

Depending on the circumstances, a load of more than, for example, 500 pounds in the horizontal direction may be considered dangerous. Accordingly, tracks 13 (or, more generally, any suitable part of body 12) may, for instance, be colour-coded to represent the potential danger in view of strong horizontal loads.

As one example, assuming a power line exerts a vertical load of about 1,000 pounds when there is no horizontal component to the load, the portions of tracks 13 corresponding to angular orientations of from 0 degrees to 15 degrees may be coloured green, the portions of tracks 13 corresponding to angular orientations of from 15 degrees to 25 degrees may be coloured yellow, and the portions of tracks 13 corresponding to angular orientations of greater than 25 degrees may be coloured red. The operator may then determine, based on the colour associated with a current angular orientation of rocker assembly 18, whether the load poses a danger.

Tracks 13 may be coloured differently for different typical power line weights. For example, assuming this time a power line exerts a vertical load of about 1,500 pounds when there is no sideways component to the load, the portions of tracks 13 corresponding to angular orientations of from 0 degrees to 5 degrees may be coloured green, the portions of tracks 13 corresponding to angular orientations of from 5 degrees to 15 degrees may be coloured yellow, and the portions of tracks 13 corresponding to angular orientations of greater than 15 degrees may be coloured red.

While the above embodiments have been described in the context of rocker assembly 18 that is configured to rotate relative to body 12, according to some embodiments a load-bearing member may more generally be configured to be displaced from a reference position in response to an applied load. For example, instead of rotation, the load-bearing member may be configured to undergo linear translation relative to body 12 in dependence on a load applied in a direction normal or otherwise at an angle to the vertical.

Figure 7A:
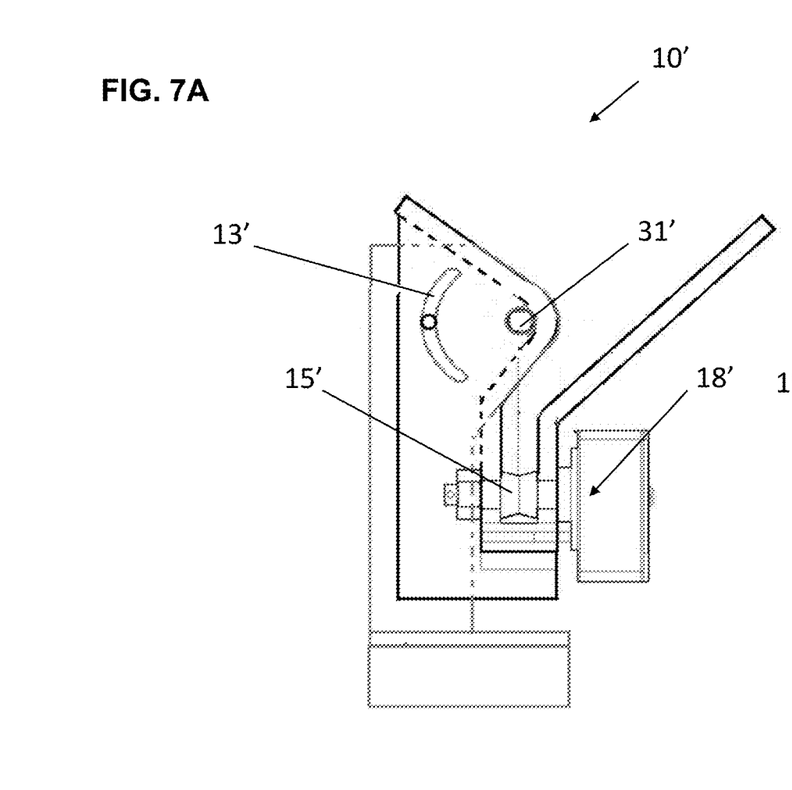
FIGS. 7A and 7B are front views of a wireholder according to embodiments of the disclosure.
Figure 7B:
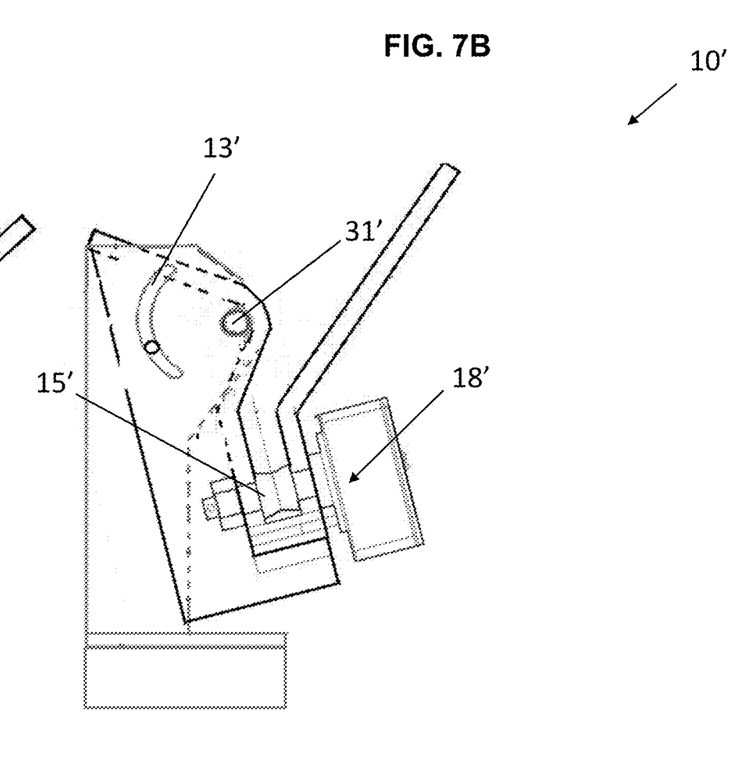

In addition, according to some embodiments, rocker assembly 18 may be configured to rotate relative to body 12 in one or more different fashions. For example, as can be seen in FIGS. 7A and 7B which show an alternative configuration of a wireholder 10', tracks 13' are located in different portions of body 12', with a pivot point 31' located vertically above V-shaped pulley 15' when rocker assembly 18' is in its reference position. In this embodiment, rather than the rocker assembly being supported in the tracks with bearings, rocker assembly 18' is supported from pivot point 31'. As the skilled person will recognize, there exist various ways in which the wireholder may be configured, provided that rotation (or, more generally, any movement) of the rocker assembly relative to the body of the wireholder may be measured in response to a horizontal load exerted by the elongate member.

According to some embodiments of the disclosure, it may be possible to determine a horizontal component of loads on wireholders using other means. For example, instead of using a rotatable rocker assembly, a wireholder may incorporate one or more additional sensors (such as one or more load cell pins outfitted with strain gauges) for measuring directly a horizontal component of loads. For example, a second load-bearing member, aligned vertically and incorporating a load cell pin, may be used. With such a design, however, care should be taken to ensure proper alignment of the power line relative to each of the first and second load-bearing members in order to obtain accurate readings of the vertical and horizontal components of the load.

According to some embodiments, a wireholder may incorporate a load-bearing member and a sensor for measuring directly a horizontal component of a load applied to the load-bearing member. For example, the load-bearing member may incorporate the sensor (which may comprise one or more strain gauges), and the load-bearing member may be oriented such that the sensor measures directly a horizontal component of a load applied to the load-bearing member.

Still further, while the above description has been provided in the context of a wireholder for holding power lines and the like, the disclosure extends more generally to devices for measuring loads applied by elongate members. For example, devices according to the present disclosure may be used, for instance, in hanging rigging applications. Such devices may be used, for example, to determine whether a line is hanging vertically or at an angle to the vertical. As the skilled person will recognize, devices according to the present disclosure may be used in a variety of other applications not necessarily discussed herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

What is claimed is:

1. A device for measuring a load applied by an elongate member,
comprising:
a body;
a load-bearing member;
a first sensor operable to measure a load applied to the load-bearing member in a first direction;
a second sensor operable to measure a displacement of the load-bearing member from a reference position,
wherein the load-bearing member is movably coupled to the body such that the load-bearing member is displaced from the reference position as a function of a load applied to the load-bearing member in a second direction, and
wherein the second sensor is operable to measure an angular orientation of the load-bearing member relative to a vertical axis.

2. The device of claim 1, wherein the reference position is aligned with the vertical axis.

3. The device of claim 1, wherein the first direction is a direction of sensitivity defined by the first sensor.

4. The device of claim 1, wherein the load-bearing member comprises the first sensor.

5. The device of claim 1, wherein the second direction is normal to the first direction.

6. The device of claim 1, wherein the first sensor comprises one or more strain gauges.

7. The device of claim 1, wherein the load-bearing member is rotatably coupled to the body such that the load-bearing member is rotated relative to the body as a function of a load applied to the load-bearing member in the second direction.

8. The device of claim 1, further comprising a transmitter communicatively coupled to the first sensor and configured to transmit a reading of a load measured by the first sensor.

9. The device of claim 8, wherein the transmitter is further communicatively coupled to the second sensor and further configured to transmit a reading of a displacement of the load-bearing member from the reference position measured by the second sensor.

10. The device of claim 1, wherein the load-bearing member comprises a surface shaped to align a direction of a load applied to the load-bearing member with a direction of sensitivity defined by the first sensor.

11. The device of claim 1, wherein the device is a wireholder and the elongate member is a power line.

12. A system comprising:
a device for measuring a load applied by an elongate member, comprising:
a body;
a load-bearing member; and
a first sensor operable to measure a load applied to the load-bearing member in a first direction, wherein the load-bearing member is rotatably coupled to the body such that the load-bearing member is rotated relative to the body as a function of a load applied to the load-bearing member in a second direction;
a second sensor operable to measure a rotation of the load-bearing member from the reference position; and
processing equipment configured, based on a reading of a load measured by the first sensor and a reading of a rotation of the load-bearing member measured by the second sensor, to determine a load applied to the load-bearing member in the second direction.

13. A method of determining a load applied to a wireholder, comprising:
providing a wireholder comprising:
a body; and
a load-bearing member movably coupled to the body such that the load-bearing member is displaced from a reference position as a function of a load applied to the load-bearing member in a first direction;
positioning an elongate member on the load-bearing member so as to apply a load on the load-bearing member; and
measuring the load applied to the load-bearing member in the first direction, wherein measuring the load comprises:
measuring, relative to the reference position, a displacement of the load-bearing member in response to the load; and
measuring, based on the displacement, the load applied to the load-bearing member in the first direction.

14. The method of claim 13, further comprising:
measuring a second load applied to the load-bearing member in a second direction,
wherein measuring the load applied to the load-bearing member in the first direction is further based on the second load applied to the load-bearing member in the second direction.

15. The method of claim 14, wherein the second direction is normal to the first direction.

16. The method of claim 13, wherein the elongate member is a power line.

17. A device for measuring a load applied by an elongate member, comprising:
a body;
a load-bearing member;
a first sensor operable to measure a load applied to the load-bearing member in a first direction; and
a transmitter communicatively coupled to the first sensor and configured to transmit a reading of a load measured by the first sensor,
wherein the load-bearing member is movably coupled to the body such that the load-bearing member is displaced from a reference position as a function of a load applied to the load-bearing member in a second direction, and
wherein the transmitter is further communicatively coupled to a second sensor and further configured to transmit a reading of a displacement of the load-bearing member from the reference position measured by the second sensor.

18. The device of claim 17, wherein the load-bearing member is rotatably coupled to the body such that the load-bearing member is rotated relative to the body as a function of a load applied to the load-bearing member in the second direction.

19. The device of claim 17, wherein the load-bearing member comprises a surface shaped to align a direction of a load applied to the load-bearing member with a direction of sensitivity defined by the first sensor.

* * * * *